US012572565B2

(12) United States Patent
Ross et al.

(10) Patent No.: US 12,572,565 B2
(45) Date of Patent: Mar. 10, 2026

(54) SEMANTIC CONTENT CLUSTERING BASED ON USER INTERACTIONS FOR CONTENT MODERATION

(71) Applicant: Scribd, Inc., San Francisco, CA (US)

(72) Inventors: Matthew Allen Strong Ross, Toronto (CA); Monique Alves Cruz, London (CA)

(73) Assignee: Scribd, Inc., San Francisco, CA (US)

( * ) Notice: Subject to any disclaimer, the term of this patent is extended or adjusted under 35 U.S.C. 154(b) by 547 days.

(21) Appl. No.: 18/117,271

(22) Filed: Mar. 3, 2023

(65) Prior Publication Data

US 2023/0281225 A1 Sep. 7, 2023

Related U.S. Application Data

(63) Continuation-in-part of application No. 17/688,843, filed on Mar. 7, 2022, now Pat. No. 11,599,728.

(51) Int. Cl.
*G06F 16/28* (2019.01)
*G06F 40/30* (2020.01)

(52) U.S. Cl.
CPC ............ *G06F 16/285* (2019.01); *G06F 40/30* (2020.01)

(58) Field of Classification Search
CPC .......... G10L 15/063; G10L 2015/0631; G10L 2015/0635; G10L 2015/0636; G06N 20/00; G06N 3/08; G06N 5/04; G06N 3/04; G06N 3/0454; G06N 3/0472; G06N 3/006; G06F 16/35; G06F 16/90344; G06F 16/24575;

(Continued)

(56) References Cited

U.S. PATENT DOCUMENTS 9,628,873 B2 4/2017 Hu et al.
10,133,589 B2 11/2018 Voronkov et al.
(Continued)

FOREIGN PATENT DOCUMENTS

WO 2008/046104 A2 4/2008

OTHER PUBLICATIONS

Pereira, Gustavo. "Recursive Embedding and Clustering." Spotify Engineering, Dec. 5, 2023, "http://engineering.atspotify.com/2023/12/recursive-embedding-and-clustering/".

(Continued)

*Primary Examiner* — Edgar X Guerra-Erazo
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to a Topic Engine. The Topic Engine captures a plurality of content identifier sequences. Each respective sequence represents an order at which a corresponding user account accessed content. The Topic Engine generates a plurality of clusters. Each cluster is associated with respective content identifiers appearing within a proximity to each other across the plurality of content identifier sequences of different user accounts. The Topic Engine obtains one or more sample content identifiers from at least one cluster via sampling the cluster. The Topic Engine extracts keywords from content represented by the one or more sampled content identifiers. The Topic Engine identifies a topic for the cluster based on the one or more extracted keywords.

17 Claims, 8 Drawing Sheets

(58) Field of Classification Search

CPC .. G06F 17/16; G06F 16/3329; G06F 16/3347;
G06F 40/284; G06F 40/00; G06F 40/216;
G06F 40/237; G06F 40/279; G06F
40/289; G06F 40/295; G06F 40/30; G06F
40/35; G06F 16/335

See application file for complete search history.

(56) References Cited

U.S. PATENT DOCUMENTS

| | | | |
|---|---|---|---|
| 10,891,322 B2 | | 1/2021 | Zhou et al. |
| 11,210,328 B2 * | | 12/2021 | Kim .......................... G06F 16/93 |
| 11,710,330 B2 * | | 7/2023 | Evans ................... G06F 40/216 |
| | | | 707/722 |
| 12,353,455 B2 * | | 7/2025 | Ross ...................... G06F 18/213 |
| 2010/0274667 A1 | | 10/2010 | Lanham et al. |
| 2012/0254333 A1 | | 10/2012 | Chandramouli et al. |
| 2014/0207770 A1 | | 7/2014 | Madsen |
| 2016/0073166 A1 | | 3/2016 | Hu et al. |
| 2017/0118336 A1 | | 4/2017 | Tapuhi et al. |
| 2018/0032606 A1 | | 2/2018 | Tolman et al. |
| 2018/0189387 A1 * | | 7/2018 | Kim .......................... G06F 40/30 |
| 2018/0253655 A1 | | 9/2018 | Wang et al. |
| 2018/0330231 A1 | | 11/2018 | Gu et al. |
| 2019/0138597 A1 | | 5/2019 | Dowell et al. |
| 2020/0193288 A1 | | 6/2020 | Li et al. |
| 2021/0173862 A1 * | | 6/2021 | Chen ...................... G06F 40/289 |
| 2021/0182328 A1 * | | 6/2021 | Rollings ................. G06F 40/30 |
| 2024/0296179 A1 * | | 9/2024 | Ross ...................... G06F 18/213 |
| 2024/0338375 A1 * | | 10/2024 | Barve ...................... G06F 40/30 |

OTHER PUBLICATIONS

C. Wartena and R. Brusse, "Topic Detection by Clustering Keywords," 2008 19th International Workshop on Database and Expert Systems Applications, Turin, Italy, 2008, pp. 54-58, doi: 10.1109/DEXA.2008.120.

Z. Fang Y. Ning and T. Zhu "Hot keyword identification for extracting web public opinion," 5th International Conference on Pervasive Computing and Applications, Maribor, Slovenia, 2010, pp. 116-121, doi: 10.1109/ICPCA.2010.5704085.

International Search Report received in PCT international application No. PCT/US23/14509, mailed Jun. 7, 2023.

Katsov Ilya: "Customer2vec: Rpresentation learning for customer analytics and personalization". GridDynamics.com. Mar. 16, 2020, pp. 1-31 XP093338216. Retrieved from the Internet: URL "https://www.griddynamics.com/blog/customer2vec-representation-learning-and-automl-for-customer-analytics-and-personalization". Retrieved on Nov. 19, 2025.

Extended European Search Report received in European application No. 23767331.4, mailed on Nov. 19, 2025.

* cited by examiner

<u>200</u>

202
Capture sequences of content identifiers for a plurality of user accounts

204
Generate clusters of semantically-related content identifiers without direct access of the referenced content 206
Obtain samples of content identifiers from a cluster(s)

300

600
Content Identifier Vector
Represenations

Doc 1:  [0.20, 1.00, 0.05, 0.65]

Doc 2:  [0.92, 0.40, 0.05, 0.77]

*   *   *

Doc M  [0.25, 0.97, 0.04, 0.60]

404
Vector Model

402
Sequences of Content Identifiers

User 1

*   *   *   *

User N

SEMANTIC CONTENT CLUSTERING BASED ON USER INTERACTIONS FOR CONTENT MODERATION

CROSS-REFERENCE TO RELATED APPLICATIONS

This application is a continuation in-part of U.S. patent application Ser. No. 17/688,843, filed on Mar. 7, 2022, which is hereby incorporated by reference in its entirety.

BACKGROUND

In the field of computer science, artificial intelligence ("A.I.") networks, such as neural networks and deep learning networks, are increasingly being employed to solve a variety of tasks and challenging problems. Such A.I. networks can consist of layers of computational graphs with nodes representing computational operations and connections in between those operations and/or computational graphs with filters representing the extraction of features from input data. Each operation computes or extracts something from the input data and/or previous layer in order to produce output data and/or next layer. Within A.I. networks there are fairly predefined operations, and there can be hundreds or thousands of these operations. Such operations can represent such computational tasks as matrix multiplication and convolution, often using many pieces of input data from within the network.

SUMMARY

Various embodiments of the Topic Engine, as described herein, thereby provide advantages over conventional systems by reducing the processing burden incurred by identifying similar content within a large-scale content corpus. The Topic Engine reduces the processing burden by leveraging captured sequences of accessed content according to content identifiers in order to generate clusters of semantically related content identifiers-without requiring direct access of each underlying portion of content.

By eliminating the processing and storage costs of accessing, scrubbing and comparing the actual content referenced by the content identifiers listed in sequences of accessed content from numerous user accounts—but still grouping the content identifiers in potentially semantically related clusters—the Topic Engine implements a technique for being able to continually determine similarities and relationships between disparate portions of content in a large-scale content corpus as the content corpus grows. This is especially advantageous in the context of a content corpus that may include many portions of user-generated (or user-provided) content since it is highly likely that content received from different user accounts will not share similar formatting, metadata and/or content section identifiers.

Various embodiments of an apparatus, methods, systems and computer program products described herein are directed to a Topic Engine. The Topic Engine captures a plurality of content identifier sequences. Each respective sequence represents an order at which a corresponding user account accessed content. The Topic Engine generates a plurality of clusters. Each cluster is associated with respective content identifiers appearing within a proximity to each other across the plurality of content identifier sequences of different user accounts. The Topic Engine obtains one or more sample content identifiers from at least one cluster via sampling the cluster. The Topic Engine extracts keywords from content represented by the one or more sampled content identifiers. The Topic Engine identifies a topic for the cluster based on the one or more extracted keywords.

According to various embodiments, the Topic Engine generates clusters based on reduce dimensionality reduction of vector representations of the content identifiers in the plurality of content identifier sequences.

In various embodiments, the Topic Engine obtains the original dimensionality for each content identifier in a given cluster and again reduces the obtained original dimensionality to further generate subclusters of content identifiers.

In some embodiments, the Topic Engine samples a subcluster to obtain one or more sampled content identifiers and extracts one or more keywords (and/or phrases) from content represented by the sampled content identifiers.

According to various embodiments, the Topic Engine further generates clusters based on embedding representations of the extracted keywords and identifies a centroid embedding representation of the cluster.

In some embodiments, the Topic Engine identifies a topic based on the centroid embedding representation of the cluster.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Content Moderation

Various embodiments described herein may be implemented to identify one or more portions of content in the large-scale content corpus that are similar to one or more portions of content that have already been previously removed from the content corpus or have been removed from being accessible to user accounts. For example, removed content (or non-permitted content) may be content that has already been identified as content that violates content guidelines and/or terms of conditions.

In such embodiments for content moderation, the respective content identifier sequences are augmented with labeling. For example, one or more content identifiers in a particular labeled content identifier sequence for a user account may have an associated label indicating content that has been removed from the content corpus or removed from being accessible to user accounts. As such, a first labeled content identifier sequence for a first user account may have a certain number of content identifiers labeled as removed content (or non-permitted content) whereas the remaining content identifiers may not be labeled as removed content (i.e. content that may or may not be permitted content). In some embodiments, one or more content identifiers may be labeled to represent permitted content as well.

The Topic Engine generates a plurality of clusters utilizing the respective labeled content identifier sequences of different user accounts. Since the labeled content identifier sequences identify some removed content, clusters generated by the Topic Engine may include labeled content identifiers (i.e. removed content, non-permitted content) and non-labeled content identifiers that appear within a proximity to the labeled content identifiers across the plurality of labeled content identifier sequences of different user accounts.

To identify which clusters correspond to the most undesirable types of content, the Topic Engine applies a density threshold to identify which clusters satisfy a threshold amount of labeled content identifiers. A cluster that satisfies the density threshold is a cluster that corresponds to more non-permitted content than other clusters because it has a higher density of labeled content identifiers for non-permitted content. It is noted that a respective cluster that satisfies the density threshold (i.e. dense cluster) may still include non-labeled content identifiers. Those non-labeled content identifiers within a dense cluster may correspond to content similar to non-permitted content and may also need to be removed (or taken down) from the content corpus.

The Topic Engine obtains one or more sample content identifiers from at least one dense cluster via sampling the cluster. The Topic Engine extracts keywords from content represented by the one or more sampled content identifiers. The Topic Engine identifies a topic for the dense cluster based on the one or more extracted keywords. A topic for a dense cluster thereby represents the topic of non-permitted content that has already been removed and the topic of some content that has not been removed—but should be subjected to content moderation review.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
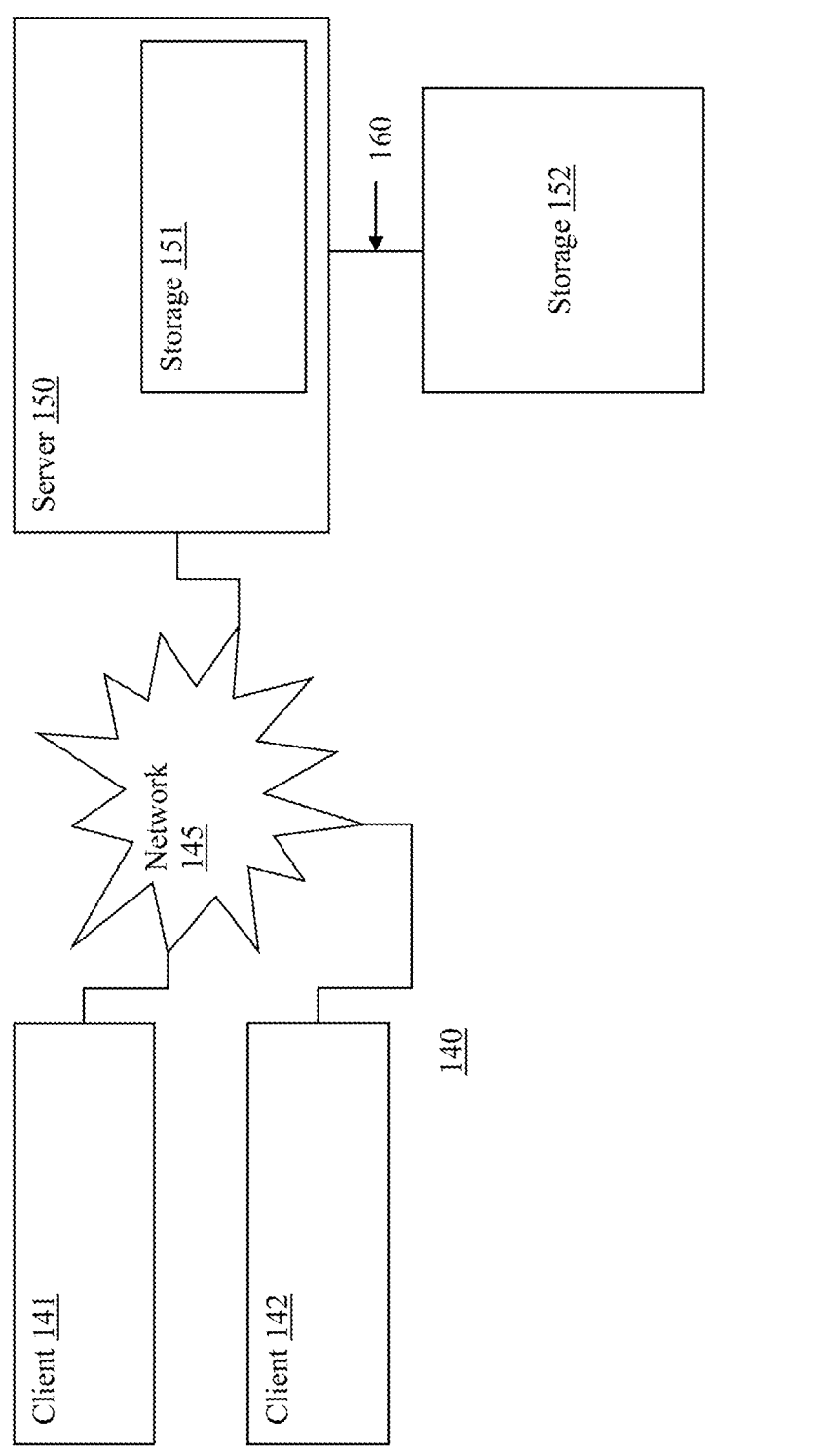
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
FIG. 1B is a diagram illustrating an exemplary environment in which some embodiments may operate.

FIG. 1B illustrates a block diagram of an example system 100 for a Topic Engine that includes a sequence capture module 102, cluster generation module 104, a sampling module 106, an extraction module 108, a topic module 110 and an optional user interface (U.I.) module 112. The system 100 may communicate with various user devices to display output The sequence capture module 102 of the system 100 may perform functionality as illustrated in FIGS. 2, 3, 4, 5 and 6 ("FIGS. 2-6")

The cluster generation module 104 of the system 100 may perform functionality illustrated in FIGS. 2-6.

The sampling module 106 of the system 100 may perform functionality illustrated in FIGS. 2-6.

The extraction module 108 of the system 100 may perform functionality as illustrated in FIGS. 2-6.

The topic module 110 of the system 100 may perform functionality as illustrated in FIGS. 2-6.

The user interface module 116 of the system 100 may display information based on functionality as illustrated in FIGS. 2-6.

In some embodiments, content identifiers may each represent portions of content of a content corpus. The content corpus may represent a digital library that includes, for example, respective portions of digital books (i.e. eBooks), digital academic papers, audiobook files, sheet music and/or digital magazine articles. The digital library may further be a component(s) of an open online publishing platform ("publishing platform") that implements the Topic Engine. In some embodiments, the content corpus, or a portion of the content corpus, may be a user-generated corpus that includes content uploaded by a plurality of user accounts.

In some embodiments, one or more user accounts of the publishing platform may access portions of content at various times. As such, a user account's access of the portions of content may be represented by a sequence of content identifiers that correspond to accessed content. The sequence thereby implicitly represents what type of content a user account accessed and explicitly represents the order at which the user account accessed the content.

The Topic Engine reflects a fundamental assumption that individuals with similar interests will tend to seek out and access the same type of content. Further, the content accessed by those individuals with similar interests may be accessed by—each individual—within a similar proximity of time. That is, a first individual (e.g. first user account) may access a first portion of content related to a type of subject matter and then access another second portion of content related to the same type of subject matter within 1 or 2 days after accessing the first portion of content. A second individual (e.g. second user account), with similar interests as the first individual, may also access those same first and the second portions of content within 1 or 2 days of each other. The specific dates of access by the individuals need not be the same or recent to each other.

The Topic Engine leverages the similar proximity of access times of content to infer a likelihood that the accessed content may relate to the same type of subject matter. Where the publishing platform may have a plurality of user accounts accessing different portions of content, the Topic Engine captures a sequence of content identifiers for each user account. Each content identifier references a specific portion of content and the captured sequences of content identifiers for the different user accounts may include the same content identifiers. Some of the content identifiers may be labeled as non-permitted content, representing content that has been removed from the content corpus or made inaccessible to the respective user accounts of the publishing platform.

Moreover, the captured sequences of content identifiers for the different user accounts may further include the same content identifiers positioned within a range of sequence proximity to other content identifiers. For example, a first sequence for a first user account may include a first content identifier that is positioned, within five sequence positions away from a second content identifier. A second sequence for a second user account may also include the same first content identifier that is positioned within two sequence positions away from the same second content identifier. For example, in a content moderation embodiment(s), a first sequence for a first user account may include a first content identifier that is positioned, within five sequence positions away from a second content identifier labeled as non-permitted content. A second sequence for a second user account may also include the same first content identifier that is positioned within two sequence positions away from the same second non-permitted content identifier.

The similarity in the distance of the sequence positions between the first and the second content identifiers in the sequences of the first and the second user accounts may reflect that the first and second user accounts have similar interests and that the first and second content identifiers thereby correspond to portions of content that related to the same type of subject matter.

In the context of a content moderation embodiment(s), a similarity in the distance of the sequence positions between the first content identifier and the second non-permitted content identifier in the sequences of the first and the second user accounts may reflect that the content represented by the first content identifier should be subject to content moderation review since it is likely to be related to a topic similar to content that has already be removed and is represented by the second non-permitted content identifier.

If the same range of sequence position proximity between the first and second content identifiers continues to occur across other sequences of content identifiers captured for different user accounts, then there is a greater likelihood that the first and second content identifiers actually do relate to the same type of subject matter.

Again, in the context of a content moderation embodiment(s), if the same range of sequence position proximity between the first content identifier and second non-permitted content identifier continues to occur across other sequences of content identifiers captured for different user accounts, then there is a greater likelihood that the first content identifier and the second non-permitted content identifier actually do relate to the same type of subject matter—and that content represented by the first content identifier (which is not currently labeled as non-permitted content) should be flagged for content moderation review to determine if that content should be identified as non-permitted content and removed from the content corpus.

In some embodiments, the Topic Engine may further analyze each proximity range instance that occurred in each sequence to identify other content identifiers positioned between the first content identifier and the second non-permitted content identifier. The Topic Engine may further flag those content identifiers for content moderation review.

The Topic Engine reduces the processing burden by leveraging the captured sequence of content identifiers to generate clusters of semantically related content identifiers without requiring direct access of each underlying portion of content referenced by those content identifiers. By eliminating the processing and storage costs of accessing, scrubbing and comparing the actual content referenced by the content identifiers but still grouping the content identifiers in potentially semantically related clusters, the Topic Engine implements a technique for being able to continually determine similarities and relationships between disparate portions of content in a large-scale content corpus as the content corpus grows.

Figure 2:
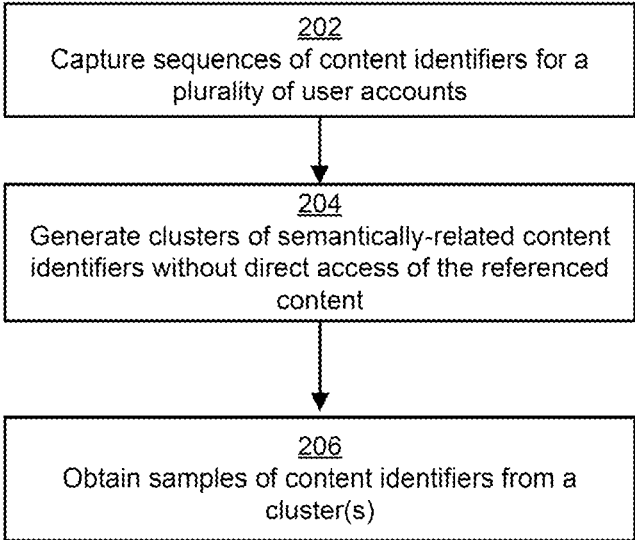
FIG. 2 is a diagram illustrating an exemplary method that may be performed in some embodiments.

As shown in flowchart 200 of FIG. 2, the Topic Engine captures sequences of content identifiers for a plurality of user accounts. (Step 202) The Topic Engine captures a sequence for each user account. A sequence of content identifiers represents an order at which a corresponding user account accessed content references by the content identifiers. It is understood that a content identifier represents a particular portion of content—but does not include actual data (i.e. text, images, audio, etc.) of that particular portion of content.

In some embodiments, the Topic Engine generates a vector representation of each content identifier that appears in the plurality of content identifier sequences. For example, a respective vector representation indicating a position in dimensional space. In some embodiments, a content identifier may be labeled as non-permitted content. In some embodiments, a content identifier may not be labeled or, in the alternative, labeled as permitted content.

In some embodiments, the Topic Engine feeds each sequence of content identifiers in a vector model (such as a word2vec Model). The vector model analyzes the sequences according to a sliding context window of time starting from a terminus of the sequence and then moving the content window back towards the opposite sequence terminus in order to learn patterns occurring across the plurality of captured sequences of content identifiers. The patterns represent which certain portions of content are read, by different user accounts, at content access times that are relatively near to each other.

For example, a pattern may indicate that the different user accounts accessed a first portion of content within a similar amount of time after accessing a second portion of content. It is understood that the user accounts were able to access that second portion of content before it was flagged as non-permitted content and later removed from the content corpus. It follows, then, that the patterns take into account access times of the second portion of content (i.e. the non-permitted content) prior to its removal but the captured sequences of content identifiers will include a content identifier for the second portion of content (i.e. the non-permitted content) with a non-permitted content label.

In response to receiving the various sequences of the content identifiers from different user accounts, the vector model outputs a vector representation for each content identifier. That is, a particular content identifier may be present in multiple sequences associated with different user accounts, but the vector model outputs a single vector representation for that particular content identifier. In some embodiments, the vector representation represents a position in dimensional space. The Topic Engine feeds the vectors representations of the content identifiers into a dimensionality reduction model, such as a model implementing a t-Distributed Stochastic Neighbor (t-SNE) Embedding algorithm. As an example, where each vector representation may have a dimensionality of 50, the dimensionality reduction model outputs modified vector representations for the content identifiers of, say, a dimensionality of 2.

The Topic Engine generates clusters of semantically related content identifiers with direct access of the referenced content. (Step 204) The Topic Engine feeds the reduced vector representations returned by the dimensionality reduction model into a clustering model. For example, the clustering model may be a Hierarchical Density-Based Spatial Clustering model ("HDB scan model"). The clustering model generates a first set of clusters based on the reduced vector representation of the content identifiers.

In some embodiments, each cluster in the first set returned by the clustering model may be a collection of plurality of nearby vector representations. However, some vector representations may not be sufficiently positioned within a proximity to other vector representations to be accurately deemed as being part of any cluster in the first set of clusters. The clustering model thereby also returns diffuse placements of some vector representations as part of the output that includes the first set of clusters. The Topic Engine identifies the diffuse vector representations and feeds those diffuse vector representations back into the clustering model. In response to receiving the diffuse vector representations, the cluster model further returns a second set of clusters.

For each cluster (from both the first and second sets of clusters), the Topic Engine obtains the content identifiers positioned in the respective cluster and accesses the original dimensionality for each content identifier. In one or more content moderation embodiments, a cluster may include one or more non-label content identifiers (i.e. representing permitted content or content not yet flagged as non-permitted content) and one or more content identifiers labeled as non-permitted content.

For example, the Topic Engine identifies all the content identifiers in a particular cluster and then obtains the vector representations for those identified content identifiers previously output by the vector model. The Topic Engine then again feeds the obtained original dimensional vector representations for the content identifiers in the particular cluster into the dimensionality reduction model.

The dimensionality reduction model outputs reduced vector representations of the content identifiers in the particular cluster. However, the reduced vector representations of the content identifiers in the particular cluster will each be different than the originally reduced vector representations of the same content identifiers. The difference is due to the content identifiers in the particular cluster being fed into the dimensionality reduction model together. Whereas, when the dimensionality reduction model previously generated the originally reduced vector representations for the same content identifiers, those originally reduced vector representations were not necessarily generated from the same grouping of content identifiers present in the particular cluster. Therefore, by generating reduced vector representations of the content identifiers in the particular cluster based on their original dimensional vector representations, the Topic Engine identifies more granular subclusters of content identifiers by way of mapping the content identifiers from the particular cluster back to the original parameter space.

The Topic Engine obtains samples of content identifiers from one or more of the clusters. (Step 206) For example, the Topic Engine samples a subset of content identifiers present with in a respective subcluster.

Figure 3:
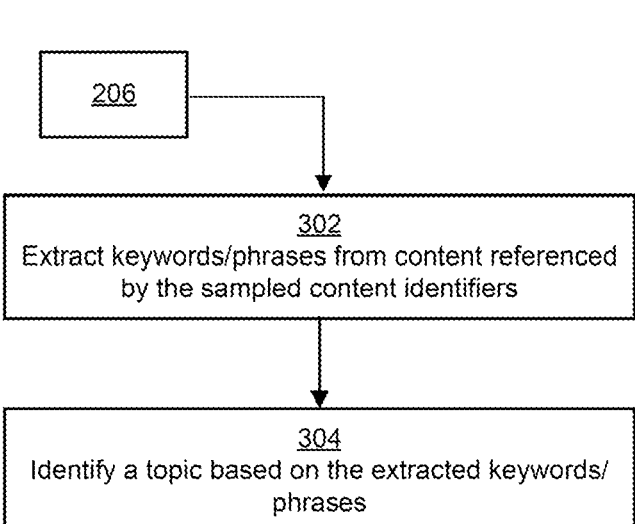
FIG. 3 is a diagram illustrating an exemplary method that may be performed in some embodiments.

As shown in flowchart 300 of FIG. 3, the Topic Engine extracts keywords and/or phrases from content referenced by the sampled content identifier for each of the one or more clusters. (Step 302) In various embodiments, the Topic Engine accesses content referenced by each content identifier in the sample subset of the respective subcluster. The Topic Engine extracts one or more keywords (and/or phrases) from each portion of accessed content. The Topic Engine feed the extracted keywords in an embedding model. For example, the embedding model by a Wikipedia2Vec model. The embedding model returns an embedding representation of each extracted keyword.

The Topic Engine generates clusters based on the embedding representations by feeding the embedding representations into an embedding cluster model. For example, the embedding cluster model may be implements a K-Means algorithm. For example, the embedding cluster model may implement a HB SCAN (Hierarchical Density-Based Spatial Clustering of Applications with Noise) algorithm. The Topic Engine obtains a centroid vector representation for each of the clusters returned by the embedding cluster model. A centroid vector representation indicates a most representative single vector in a cluster returned by the embedding cluster model. A centroid vector representation thereby indicates an extracted keywords (and/or phrases) most relevant to a cluster returned by the embedding cluster model.

The Topic Engine identifies a topic of each of the one or more clusters based on the extracted keywords and/or phrases from content associated with the respective cluster. (Step 304) In some embodiments, the Topic Engine obtains (or generates) a set of words that are similar to extracted keywords that correspond to the centroid vector representation. The Topic Engine generates a ranked list of the obtained set of words. For example, the ranked list can by a ranking ordered according to the score of each obtained similar word generated by a cosine similarity module. The Topic Engine feeds the ranked list into a topic model. For example, the topic model may be a zero shot classification model. The topic model returns a topic(s) for each submitted ranked list.

Figure 4:
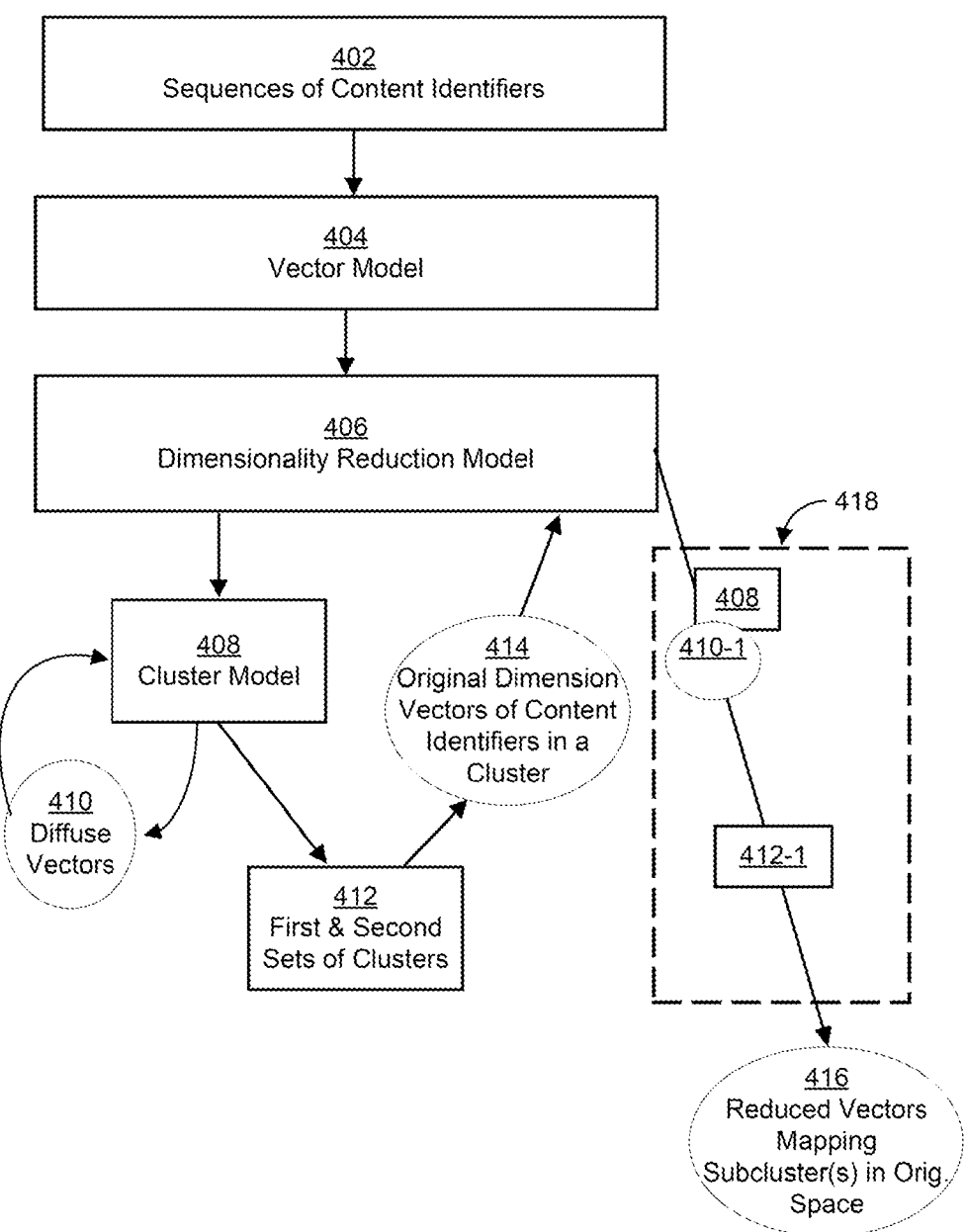
FIG. 4 is a diagram illustrating an exemplary environment in which some embodiments may operate.

As shown in FIG. 4, a diagram of an embodiment of Topic Engine illustrates sequences of content identifiers 402 fed into vector model 404. The vector model 404 outputs vector representations for each content identifier present in the sequences of content identifiers 402.

The vector representations are fed into a dimensionality reduction model 406. The dimensionality reduction model 406 outputs modified vector representations for the content identifiers. For example, the modified vector representations for the content identifiers may be associated with a reduced dimensionality as compared to the original dimensionality of the vector representations for each content identifiers from the vector model 404.

The modified vector representations are fed into a clustering model 408. The clustering model returns a first set of clusters 412 that include densely proximate content identifiers positioned according to the corresponding modified vector representations. Diffusely positioned vector representations 410 not positioned within the returned clusters are re-fed back into the cluster model 408. The cluster model 408 further returns a second set of clusters 412 based on the diffuse vector representations 410.

For each cluster in the returned clusters 412, the Topic Engine obtains original dimensionality vector representations for the content identifiers positioned in a respective cluster. That is, the Topic Engine obtains a content identifier's original dimensionality vector representation previously generated by the vector model 404. The original dimensionality vector representations 414 of the content identifiers in the respective cluster are fed into the dimensionality reduction model 406 and after initiates for a subsequent round of clustering 418.

The dimensionality reduction model 406 outputs reduced vector representations of the fed content identifiers 414. The Topic Engine's subsequent round of clustering 418 applies the cluster model 408 to the reduced vector representation of the respective content identifiers 414. Diffuse vectors 410-1 are again identified from a first set of clusters returned in the subsequent round 418 by the cluster model 408. The diffuse vectors 410-1 are fed back into the cluster model 408 and granular subclusters 412-1 are generated by the cluster model 408 during the subsequent round 418. After generation of the granular subclusters 412-1 are generated, the content identifiers of each respective granular subcluster 412-1 are mapped back to the original space of the original dimensionality reduction by the Topic Engine.

Figure 5:
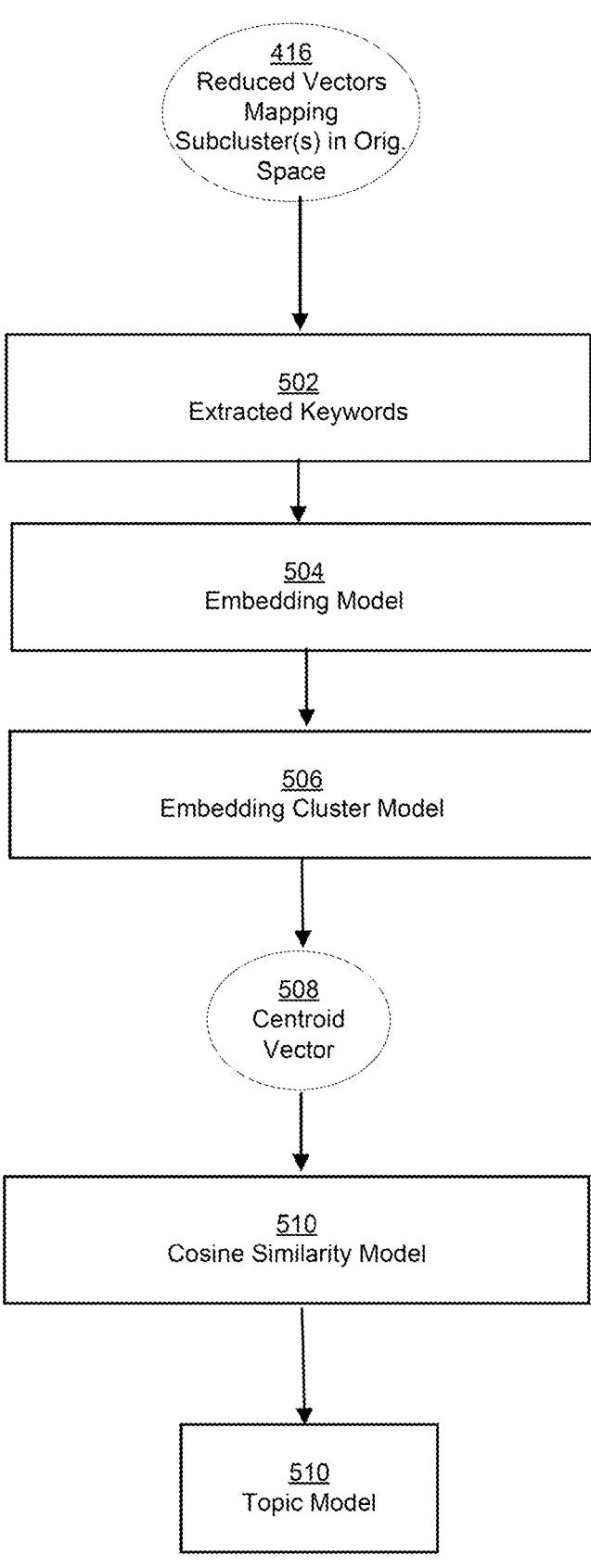
FIG. 5 is a diagram illustrating an exemplary environment in which some embodiments may operate.

As shown in FIG. 5, a diagram of an embodiment of Topic Engine illustrates samples content identifiers from the subclusters and extracts keywords (and/or phrases) 502 from content referenced by the sampled content identifiers. The extracted keywords 502 are fed into an embedding model 504. The embedding model 504 returns embedding representations of the extracted keywords 418.

The embedding representations are fed into an embedding cluster model 506. The embedding cluster model 506 returns clusters based on the embedding representations of the extracted keywords 502.

For each cluster returned by the embedding cluster model 506, the Topic Engine obtains a centroid vector representation 508. The Topic Engine obtains a set of similar words with respect to the extracted keyword that corresponds to the centroid vector representation 508. The Topic Engine generates a ranked list of the set of similar words by feeding the set of similar words into a cosine similarity model 510. The Topic Engine feeds the ranked list into a topic model 510. The topic model 510 returns a topic(s) for the respective cluster associated with the centroid vector representation 508.

Figure 6:
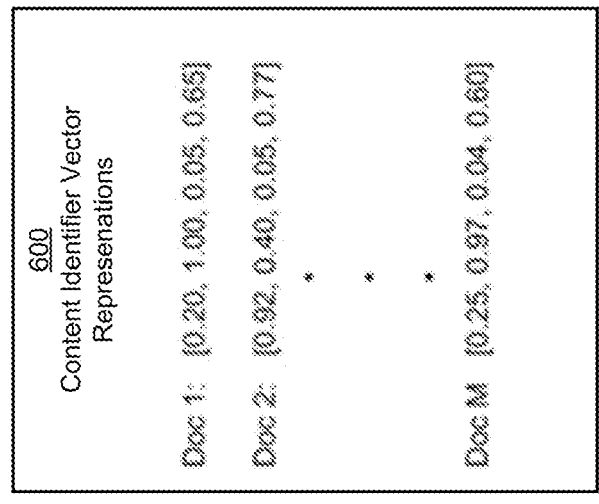
FIG. 6 is a diagram illustrating an exemplary environment in which some embodiments may operate.
Figure 6:
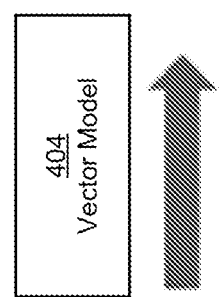
Figure 6:
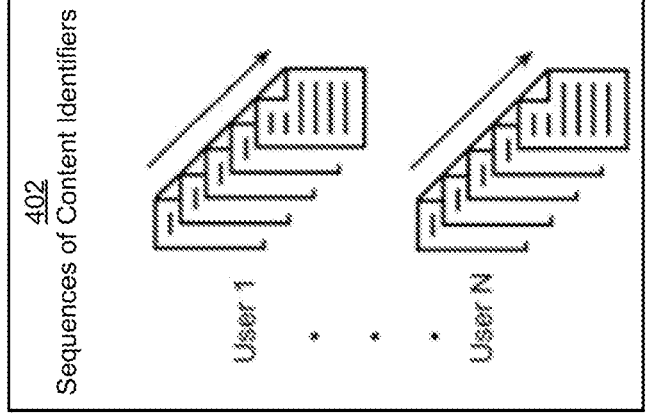

As shown in FIG. 6, the Topic Engine captures sequences of content identifiers 402 representing a on order at which various user accounts (e.g. User 1 . . . User N) accessed different portions of content referenced by the content identifiers. The Topic Engine feed the sequences 402 into a vector model 404. The vector model 404 returns vector representations 600 for each content identifier (Doc 1, Doc 2 . . . Doc M) present in the sequences 402.

Various embodiments of the Topic Engine may use any suitable machine learning training techniques to train the machine learning network 130 for each sensor, including, but not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 7:
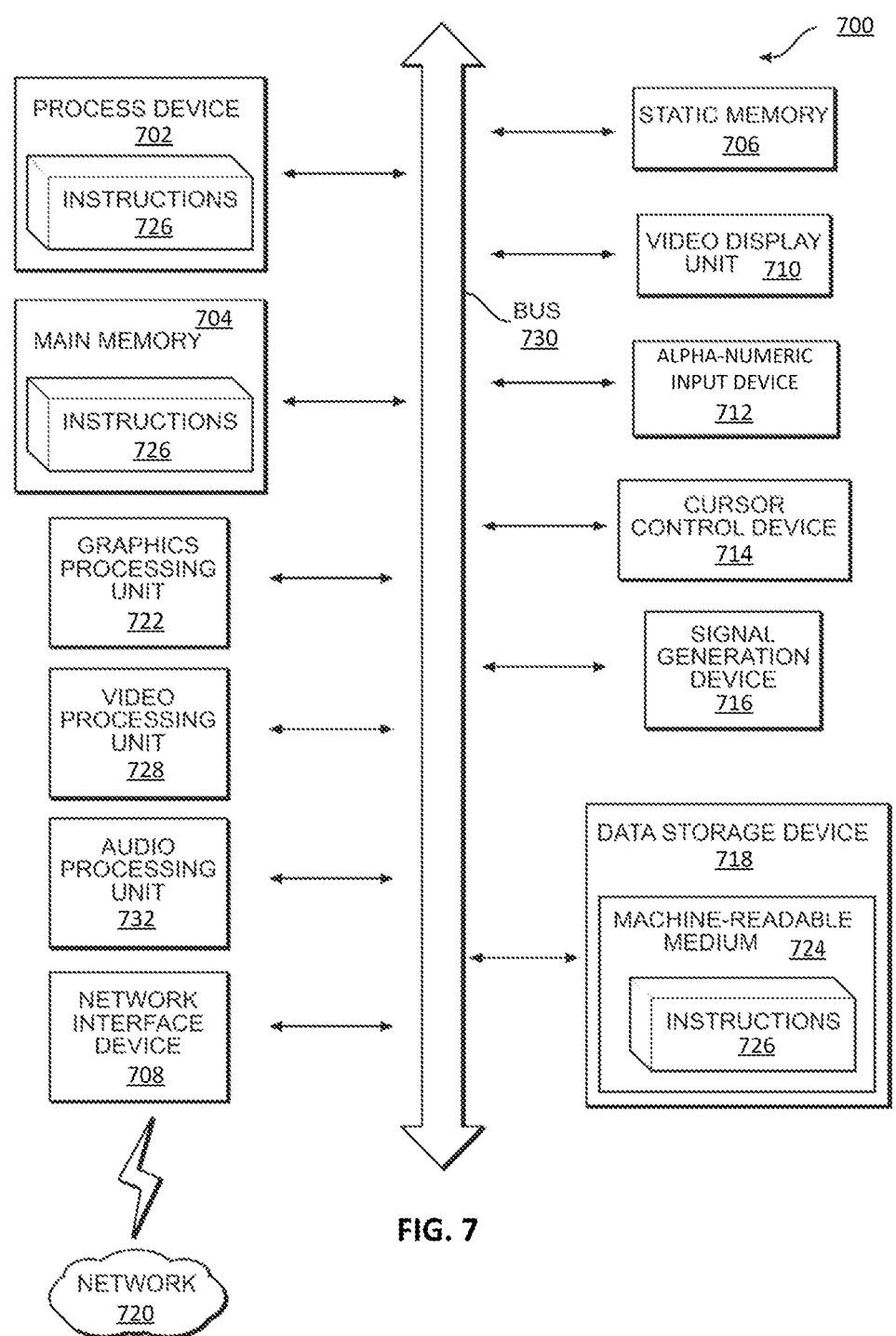
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:

capturing a plurality of content identifier sequences, each respective sequence corresponds with a different user account and representing an order at which the corresponding user account accessed content, wherein at least a subset of the plurality of content identifier sequences includes respective content identifier sequences that include at least a first content identifier and a second content identifier, the second content identifier labeled as non-permitted content;

generating a first non-permitted content cluster based on a recurring range of proximity of respective positions of the first content identifier and the second non-permitted content identifier appearing across the subset's content identifier sequences;

determining the first non-permitted content cluster satisfies a density threshold, the density threshold indicating whether a respective cluster is associated with a threshold amount of instances of the recurring range of proximity to a non-permitted content identifier;

obtaining one or more sample content identifiers from the first non-permitted content cluster via sampling the cluster;

extracting one or more keywords from content represented by the one or more sampled content identifiers obtained from the first non-permitted content cluster;

identifying a topic for the first non-permitted content cluster based on the one or more extracted keywords; and flagging one or more content identifiers present within instances of recurring ranges of proximity, upon which the first non-permitted content cluster is based, for content moderation review.

2. The computer-implemented method of claim 1, wherein generating a plurality of clusters comprises:

generating a vector representation of each content identifier that appears in the plurality of content identifier sequences, the respective vector representation indicating a position in dimensional space;

generating a first set of clusters, each cluster in the first set comprising a density of content identifiers positioned according to corresponding vector representation; and generating a second set of clusters, each cluster in the second set comprising a diffuse collection of one or more content identifiers positioned according to corresponding vector representation.

3. The computer-implemented method of claim 2, comprising:

wherein generating the first and the second sets of clusters comprises: reducing a dimensionality of each vector representation prior to generating the first and the second sets of clusters; and after generating the first and the second sets of clusters based on reduced dimensionality vector representations of the content identifiers, for each respective cluster:

(i) obtaining an original dimensionality from a corresponding vector representation of each of the content identifiers associated with the respective cluster; and (ii) reduce a dimensionality the obtained original dimensionalities of each of the content identifiers associated with the respective cluster; and (iii) generate one or more subclusters of the content identifier based on the respective reduced original dimensionalities.

4. The computer-implemented method of claim 3, wherein extracting one or more keywords from content represented by the one or more sampled content identifiers comprises:

sampling one or more contend identifiers from the one or more of the subclusters.

5. The computer-implemented method of claim 4, further comprising:

obtaining an embedding representation for each of the one or more extracted keywords; and generating one or more clusters based on the embedding representations.

6. The computer-implemented method of claim 5, further comprising:

obtaining a centroid vector representation from one or more of the embedding representation clusters; and determining one or more similar words associated with the centroid vector representation.

7. The computer-implemented method of claim 6, wherein identifying a topic for the cluster based on the one or more extracted keywords comprises:

generating a ranked listing of the one or more similar words based on an extent of similarity of each similar word with respect to the centroid vector representation;

identifying the topic via applying zero shot classification to the ranked listing of the one or more similar words.

8. A system comprising one or more processors, and a non-transitory computer-readable medium including one or more sequences of instructions that, when executed by the one or more processors, cause the system to perform operations comprising:

capturing a plurality of content identifier sequences, each respective sequence representing an order at which a corresponding user account accessed content, wherein a first content identifier corresponds to first content provided by a first user, a second content identifier corresponds to second content provided by a second user, the first and second content comprising differing formats, wherein the second content identifier is labeled as non-permitted content;

generating a first non-permitted content cluster based on a recurring range of proximity of respective positions of the first content identifier and the second non-permitted content identifier appearing across the subset's content identifier sequences;

determining the first non-permitted content cluster satisfies a density threshold, the density threshold indicating whether a respective cluster is associated with a threshold amount of instances of the recurring range of proximity to a non-permitted content identifier;

obtaining one or more sample content identifiers from the first non-permitted content cluster via sampling the cluster;

extracting one or more keywords from content represented by the one or more sampled content identifiers obtained from the first non-permitted content cluster;

identifying a topic for the first non-permitted content cluster based on the one or more extracted keywords; and flagging one or more content identifiers present within instances of recurring ranges of proximity, upon which the first non-permitted content cluster is based, for content moderation review.

9. The system of claim 8, wherein generating a plurality of clusters comprises:

generating a vector representation of each content identifier that appears in the plurality of content identifier sequences, the respective vector representation indicating a position in dimensional space;

generating a first set of clusters, each cluster in the first set comprising a density of content identifiers positioned according to corresponding vector representation; and generating a second set of clusters, each cluster in the second set comprising a diffuse collection of one or more content identifiers positioned according to corresponding vector representation.

10. The system of claim 9, comprising:

wherein generating the first and the second sets of clusters comprises: reducing a dimensionality of each vector representation prior to generating the first and the second sets of clusters; and after generating the first and the second sets of clusters based on reduced dimensionality vector representations of the content identifiers, for each respective cluster:

(i) obtaining an original dimensionality from a corresponding vector representation of each of the content identifiers associated with the respective cluster; and (ii) reduce a dimensionality the obtained original dimensionalities of each of the content identifiers associated with the respective cluster; and (iii) generate one or more subclusters of the content identifier based on the respective reduced original dimensionalities.

11. The system of claim 10, wherein extracting one or more keywords from content represented by the one or more sampled content identifiers comprises:

sampling one or more contend identifiers from the one or more of the subclusters.

12. The system of claim 11, further comprising:

obtaining an embedding representation for each of the one or more extracted keywords; and generating one or more clusters based on the embedding representations.

13. The system of claim 12, further comprising:

obtaining a centroid vector representation from one or more of the embedding representation clusters; and determining one or more similar words associated with the centroid vector representation.

14. The system of claim 13, wherein identifying a topic for the cluster based on the one or more extracted keywords comprises:

generating a ranked listing of the one or more similar words based on an extent of similarity of each similar word with respect to the centroid vector representation;

identifying the topic via applying zero shot classification to the ranked listing of the one or more similar words.

15. A computer program product comprising a non-transitory computer-readable medium having a computer-readable program code embodied therein to be executed by one or more processors, the program code including instructions to:

capturing a plurality of content identifier sequences, each respective sequence representing an order at which a corresponding user account accessed content;

generating a plurality of clusters, associated with respective content identifiers appearing within a proximity to each other across the plurality of content identifier sequences of different user accounts, wherein one of the clusters comprises a first non-permitted content cluster associated with a first content identifier appearing with the range of proximity to a second content identifier, the second content identifier labeled as non-permitted content, wherein generating the plurality of clusters comprises:

(i) generating a vector representation of each content identifier that appears in the plurality of content identifier sequences, the respective vector representation indicating a position in dimensional space;

(ii) generating a first set of clusters, each cluster in the first set comprising a density of content identifiers positioned according to corresponding vector representation; and (iii) generating a second set of clusters, each cluster in the second set comprising a diffuse collection of one or more content identifiers positioned according to corresponding vector representation;

obtaining one or more sample content identifiers from at least one cluster via sampling the cluster;

extracting one or more keywords from content represented by the one or more sampled content identifiers;

identifying a topic for the cluster based on the one or more extracted keywords.

16. The computer program product of claim 15, comprising:

wherein generating the first and the second sets of clusters comprises: reducing a dimensionality of each vector representation prior to generating the first and the second sets of clusters; and after generating the first and the second sets of clusters based on reduced dimensionality vector representations of the content identifiers, for each respective cluster:

(i) obtaining an original dimensionality from a corresponding vector representation of each of the content identifiers associated with the respective cluster; and (ii) reduce a dimensionality the obtained original dimensionalities of each of the content identifiers associated with the respective cluster; and (iii) generate one or more subclusters of the content identifier based on the respective reduced original dimensionalities.

17. The computer program product of claim 16, wherein extracting one or more keywords from content represented by the one or more sampled content identifiers comprises:

sampling one or more contend identifiers from the one or more of the subclusters;

obtaining an embedding representation for each of the one or more extracted keywords; and generating one or more clusters based on the embedding representations.

* * * * *